United States Patent
Loen et al.

(10) Patent No.: US 9,358,766 B2
(45) Date of Patent: *Jun. 7, 2016

(54) APPLYING BIAXIALLY ORIENTED POLYESTER ONTO A METAL SUBSTRATE

(71) Applicants: Toray Plastics (America), Inc., North Kingstown, RI (US); James E. Velliky, Jacksonville, FL (US); Mark V. Loen, Mesa, AZ (US)

(72) Inventors: Mark V. Loen, Maricopa, AZ (US); James E Velliky, Jacksonville, FL (US); Jan K Moritz, North Kingstown, RI (US)

(73) Assignee: TORAY PLASTICS (AMERICA), INC., North Kingstown, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/271,870

(22) Filed: May 7, 2014

(65) Prior Publication Data

US 2014/0238601 A1 Aug. 28, 2014

Related U.S. Application Data

(60) Continuation-in-part of application No. 13/759,538, filed on Feb. 5, 2013, now Pat. No. 8,784,601, which is a division of application No. 13/108,584, filed on May 16, 2011, now Pat. No. 8,404,064, which is a continuation-in-part of application No. 12/388,011, filed on Feb. 18, 2009, now Pat. No. 7,942,991, which is a continuation-in-part of application No. 11/530,723, filed on Sep. 11, 2006, now Pat. No. 7,678,213.

(60) Provisional application No. 60/716,053, filed on Sep. 13, 2005.

(51) Int. Cl.

| B32B 37/00 | (2006.01) |
| B32B 37/20 | (2006.01) |
| B32B 15/18 | (2006.01) |
| B32B 27/08 | (2006.01) |
| B32B 27/36 | (2006.01) |
| B32B 37/06 | (2006.01) |

(Continued)

(52) U.S. Cl.
CPC ............. *B32B 37/206* (2013.01); *B32B 15/09* (2013.01); *B32B 15/18* (2013.01); *B32B 27/08* (2013.01); *B32B 27/36* (2013.01); *B32B 37/003* (2013.01); *B32B 37/06* (2013.01); *B32B 38/185* (2013.01); *B32B 37/04* (2013.01); *B32B 37/08* (2013.01); *B32B 38/105* (2013.01); *B32B 38/162* (2013.01); *B32B 39/00* (2013.01); *B32B 2305/30* (2013.01); *B32B 2307/406* (2013.01); *B32B 2307/518* (2013.01); *B32B 2307/546* (2013.01); *B32B 2307/584* (2013.01); *B32B 2307/714* (2013.01); *B32B 2309/02* (2013.01); *B32B 2309/10* (2013.01); *B32B 2309/105* (2013.01); *B32B 2309/14* (2013.01); *B32B 2309/72* (2013.01); *B32B 2310/0445* (2013.01); *B32B 2310/0812* (2013.01); *B32B 2310/0825* (2013.01); *B32B 2311/00* (2013.01); *B32B 2367/00* (2013.01)

(58) Field of Classification Search
CPC ........ B29C 65/10; B29C 65/106; B32B 7/12; B32B 15/08; B32B 15/18; B32B 27/08; B32B 27/36; B32B 37/02; B32B 37/06; B32B 37/206
USPC ............. 156/64, 82, 250, 259, 267, 281, 282, 156/308.2, 309.9, 322, 324, 555, 582, 583.1
See application file for complete search history.

(56) References Cited

U.S. PATENT DOCUMENTS

| 3,679,513 A | 7/1972 | Addinall et al. |
| 5,059,460 A | 10/1991 | Heyes et al. |

(Continued)

*Primary Examiner* — James Sells

(57) ABSTRACT

The invention is a laminating process which is directed toward economical production methods for scalable amounts of production which develop properties suitable for a broad based product line. In particular, the product is capable of important key components of commercial properties such as adhesion, scratch resistance, chemical inertness, and bending without failure.

5 Claims, 2 Drawing Sheets

Figure 1:
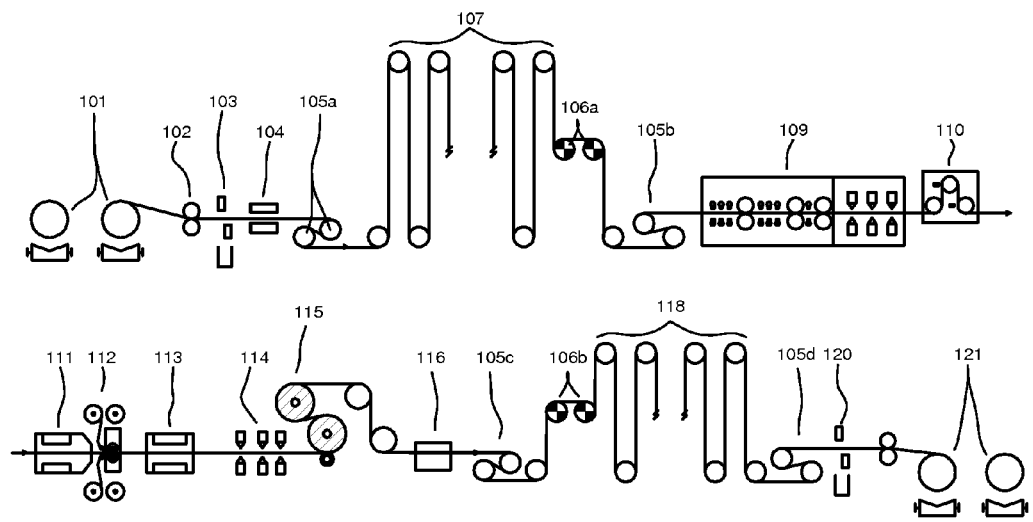

(51) Int. Cl.
  *B32B 38/18* (2006.01)
  *B32B 15/09* (2006.01)
  *B32B 37/04* (2006.01)
  *B32B 37/08* (2006.01)
  *B32B 38/00* (2006.01)
  *B32B 38/16* (2006.01)
  *B32B 39/00* (2006.01)

(56) References Cited

U.S. PATENT DOCUMENTS

| | | |
|---|---|---|
| 5,093,208 A | 3/1992 | Heyes et al. |
| 5,149,389 A | 9/1992 | Heyes et al. |
| 5,318,648 A | 6/1994 | Heyes et al. |
| 5,330,605 A | 7/1994 | Tanaka et al. |
| 5,407,702 A | 4/1995 | Smith et al. |
| 5,679,200 A | 10/1997 | Newcomb et al. |
| 5,695,579 A | 12/1997 | Rowland |
| 5,919,517 A | 7/1999 | Levendusky et al. |
| 6,017,599 A | 1/2000 | Sakamoto et al. |
| 6,080,260 A | 6/2000 | Yasunaka et al. |
| 6,164,358 A | 12/2000 | Kaguma et al. |
| 6,200,409 B1 | 3/2001 | Tanaka et al. |
| 7,678,213 B1 | 3/2010 | Loen et al. |
| 7,942,991 B1 * | 5/2011 | Loen et al. ............ 156/64 |
| 8,343,291 B1 * | 1/2013 | Loen et al. ............ 156/64 |
| 8,404,064 B1 * | 3/2013 | Loen et al. ............ 156/64 |
| 8,784,601 B1 * | 7/2014 | Loen et al. ............ 156/281 |

\* cited by examiner

US 9,358,766 B2

APPLYING BIAXIALLY ORIENTED POLYESTER ONTO A METAL SUBSTRATE

CROSS REFERENCE TO RELATED APPLICATIONS

This application is a continuation in part of U.S. Pat. No. 8,784,601 filed on Feb. 5, 2013, which is a divisional of U.S. Pat. No. 8,404,064, filed on May 16, 2011, which is a continuation in part of U.S. Pat. No. 7,942,991 filed on Feb. 18, 2009, which is a continuation in part of U.S. Pat. No. 7,678, 213 filed on Sep. 11, 2006, which claims the benefit of U.S. Provisional Application No. 60/716,053 filed on Sep. 13, 2005. All referenced applications are incorporated herein by reference.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION (1) Field of the Invention

This application is directed to laminating films in the solid state onto metal substrates. In particular, applying bi-axially oriented polyester films onto metal substrates to create a chemical bond on an industrial processing line whereby multiple desirable commercial properties are simultaneously developed.

(2) Description of Related Art

Others have described laboratory processing steps related to putting films onto metal surfaces. For example, U.S. Pat. No. 5,330,605 describes preheating a metal strip and then laminating a biaxially oriented copolyester resin film. However, a post treating step has been found to be necessary for permanent commercial adhesion in many important markets, and the post treating step is troublesome when used with an oriented polyester film due to crystalline property changes. It is difficult to obtain sufficient bonding for demanding stamping applications with the additional demanding chemical resistance requirements. Since crystallinity provides important commercial pencil hardness, toughness, and chemical resistance properties, a high temperature post heating step will change the crystallinity in actual use.

U.S. Pat. No. 5,149,389 and U.S. Pat. No. 5,093,208 describes a thermal laminating process where a metal strip is preheated, laminated, post heated, and quenched in water. The process targets the creation of non-crystalline polyester coating that is generally useful for can making. Unfortunately, the lack of crystallinity is a distinct disadvantage in creating desirable simultaneous commercial characteristics such as pencil hardness, adhesion, and chemical resistance.

U.S. Pat. No. 5,318,648 describes a thermal laminating process where the cooling process is specifically performed to avoid creating crystallinity in the laminate film. This has similar problems with pencil hardness and chemical resistance properties just described.

U.S. Pat. No. 3,679,513 describes a thermal laminating process for a polyethylene. The process does not describe pretreating the metal surface by raising the surface energy nor does it describe methods of creating crystallinity in the finished laminate film to develop pencil hardness or bending toughness. Polyethylene is not known to develop desirable commercial properties and the low melting point of polyethylene is undesirable for many markets when compared to other polymers.

U.S. Pat. No. 5,679,200 describes a thermal laminating process for applying a film to a metal strip where the laminating rolls provide a specific force. The patent is directed toward a specific laminating nip force related to avoiding the pickup of film onto the nip rolls. The process does not describe pretreating the metal surface by raising the surface energy nor does it describe methods of creating crystallinity in the finished laminate film.

U.S. Pat. No. 5,695,579 describes a thermal laminating process where the polymer coated metal is rapidly and immediately quenched after post treating to ensure that the coating is amorphous. The described process is designed to avoid creating crystallinity in the finished laminate film. The process does not describe pretreating the metal surface by raising the surface energy nor does it describe methods of creating crystallinity in the finished laminate film.

Others have worked on important commercial-technical issues such as the eliminating entrapped air between the film and metal substrate. For example, U.S. Pat. No. 6,200,409 describes an improved laminating process which works on eliminating air bubbles by heating the laminating nip rolls and preheating the film prior to laminating. Similarly, U.S. Pat. No. 6,164,358 describes efforts at reducing air entrapment by using a support roll with a projected film angle. In this disclosure, a commercially acceptable amount is defined as an 8% area covered by entrapped air. Others, such as U.S. Pat. No. 5,679,200, have attempted to handle trapped air through increased nip forces.

Important commercial markets are open to a laminate provided that acceptable adhesion, pencil hardness, and corrosion protection can be simultaneously achieved. These markets are currently served by the pre-painted coil coated industry. Typical products include the following: Building and Construction Products, Transportation Products, Business and Consumer Products.

In particular, Containers and Packaging Products such as:
a. Cans, Ends, Tabs, Crowns, & Closures
b. Barrels, Drums & Pails
c. Strapping & Seals, and
d. Draw & Ironed can bodies
are important markets that can be served by a laminate from a laminating process.

It is important to note that the referenced patents have not resulted in a commercially viable high production thermal laminating line in the US. The difficulties in simultaneously scaling up production, creating an economically viable process, and developing suitable commercial properties have been strong barriers to the actual implementation of a laminating process. The previous efforts by others have been lacking in important technical aspects of cooperation between the processing steps, economic viability, and suitable commercial properties. In particular, film properties have not been carefully designed to work with processing steps that foster high levels of adhesion and chemical inertness.

Current high production laminating methods in the United States address metal substrates, i.e. 0.005" and above, are primarily directed at utilizing press on adhesives which are applied by a roller onto the metal substrate, and the adhesive is dried in an oven prior to the laminating step. This process is commonly added to, or is a part of, a commercial coil paint line. The application of the film to the metal substrate is generally done close to ambient temperatures. The adhesive is separately applied to the metal substrate and is usually not a part of the film, such as a multilayer film.

It is important that high production thermal laminating methods have little or no visible entrapped air between the metal substrate and the film. Entrapped air causes thinning of the coating at an unpredictable amount. In particular, when a formed part is bent and the bend occurs where an air bubble exists in the coating, an increased likelihood of failure results. Air entrapment is a serious issue when the air bubble size is significant relative to the coating thickness, and the frequency is high. It is also visually disturbing at an 8 percent level to a customer, on a surface area basis, and raises unnecessary questions about process control.

It is important that the coating has the necessary pencil hardness, that is, surface scratch resistance, formability, and suitable chemical resistance. Coating hardness must be balanced against brittleness. A hard coating has an increased likelihood of splitting on the bend of a formed part. If the coating splits, the metal is exposed and there is likelihood of a corrosive failure at that spot.

In summary, it has been difficult to develop the necessary simultaneous properties for a commercial thermoplastic coating on a thick metal substrate at an economical cost. The coating needs the simultaneous capability of: developing suitable bonding to the metal substrate, economical production, having suitable pencil hardness, eliminating air entrapment, obtaining a high level of chemical resistance, and having the ability to withstand a tight metal bend without splitting.

BRIEF SUMMARY OF THE INVENTION

The invention is a laminating process which is directed toward economical production methods at scalable amounts of production which develop properties suitable for a product line with demanding chemical resistance properties. In particular, the product is capable of important key components of commercial properties such as adhesion, scratch resistance, chemical inertness, eliminating air entrapment, and bending without failure.

BRIEF DESCRIPTION OF THE SEVERAL VIEWS OF THE DRAWING(S)

Figure 2:
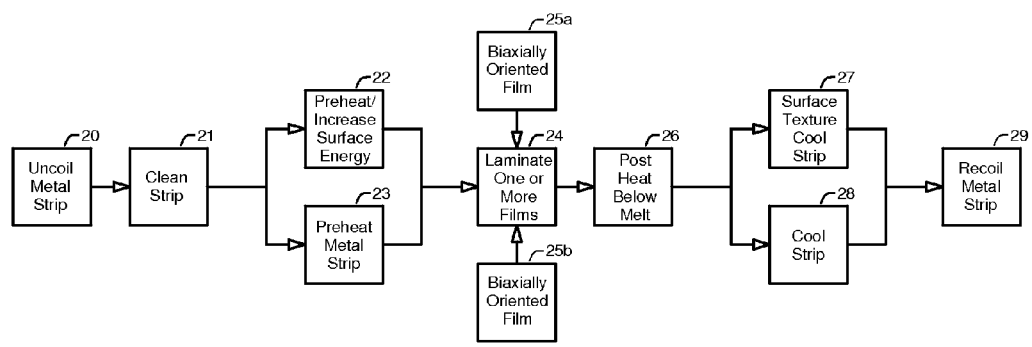
Figure 3A:
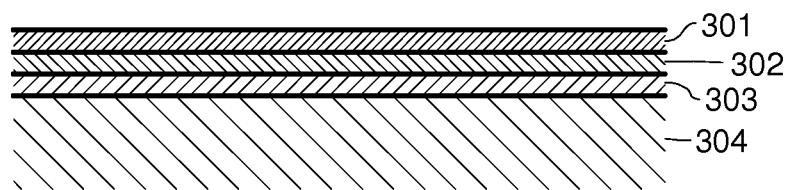
Figure 3B:
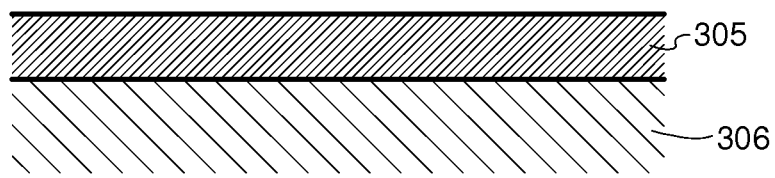
Figure 4:
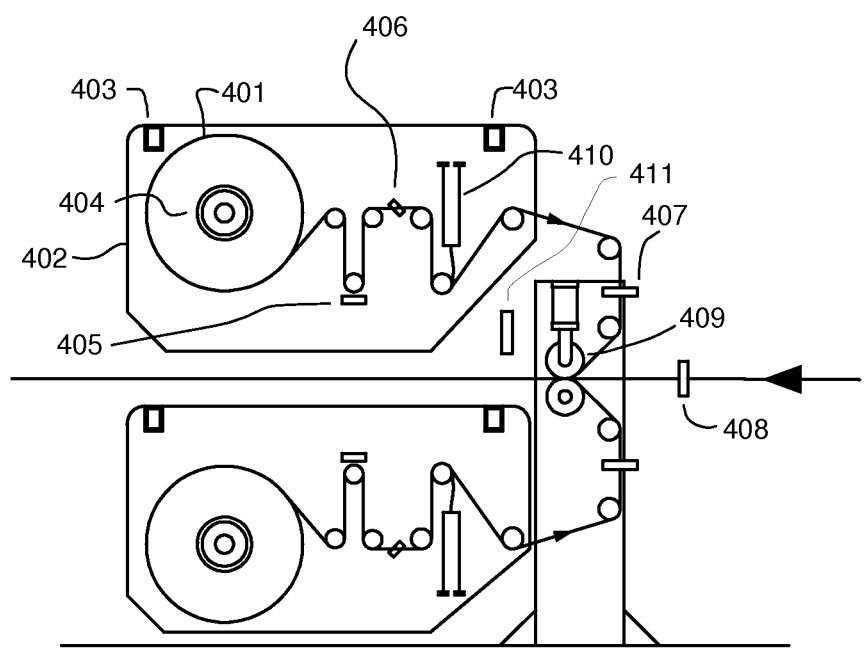

FIG. 1 shows an embodied commercial line.
FIG. 2 shows a general embodiment of the invention.
FIGS. 3A-3B show various embodied layer configurations.
FIG. 4 shows an embodied laminating station.

DETAILED DESCRIPTION OF THE INVENTION

The invention is a laminating process that simultaneously creates desirable commercial products in a crystalline polyester film due to its unique composition as an affordable engineered polymer. In particular, essential commercial characteristics of scratch resistance, chemical inertness, and permanent adhesion can be developed which are highly competitive to paint. Polyester is generally more affordable than other engineered polymers in the marketplace, and is chemically similar to many paints which are short chain polyesters admixed with cured epoxies.

When considering current pricing trends in thermoplastics, the better priced plastics tend to be polyethylene (high density, low density, linear low density), polystyrene, polypropylene, ABS, acetal homopolymer, and polyester (both PET and PBT). This is in reference to the types of polymer grades that are reasonably available in volume pricing that are extrudable at a commercial speed for a thermoplastic coating of about 0.5 to 8.0 mils thick. However, it has been found difficult to find satisfactory coating performance among many of the lower priced polymers, in particular, the polyolefins. Surface scratch resistance, in particular, has been elusive.

The higher priced polymers, such as Acrylic, Fluoropolymers, Liquid Crystal Polymers, Polyamide/imide, Polyarylate, Polyetherimide, Polyetherketone, Polyphenylene Sulfide, Polysulfone, Cellulosics, Polycarbonate and Polyurethane are financially unappealing. However, these polymers can be applied with satisfactory results by using tie layers and the teachings of this invention.

Table 1 shows a rough affordability ratio for the same coating thickness on a price per pound when additionally considering the polymer specific gravity. Although Table 1 could be shown as various ranges depending upon the polymer grades chosen, it is a rough average for a simplified view.

TABLE 1

| | |
|---|---|
| Polyethylene | 1 |
| Polypropylene | 1 |
| ABS | 1.1 |
| PVC | 1.3 |
| Polystyrene | 1.3 |
| APET | 1.4 |
| Acrylic | 1.4 |
| Polyester | 1.6 |
| Acetal | 1.9 |
| Nylon 6/6 | 2.0 |
| Polyurethane | 2.2 |
| Polycarbonate | 2.4 |

Biaxially-oriented polyethylene terephthalate (also referred to as BoPET) is a polyester film made by stretching a film made from polyethylene terephthalate (PET) to create better properties such as tensile strength and superior chemical resistance by adding desirable crystallinity. BoPET is made on a manufacturing process line that begins with an extruded polyester film and is immediately quenched by a chill roll. In this initial condition, the polyester film is relatively amorphous with little crystallinity. To create a BoPET film, the solid film is stretched in the machine direction (i.e. down its length) and subsequently in the transverse direction (across the width) in a two-step process. In both steps the film is heated to a particular temperature, typically above 390° F., and dimensionally stretched in both directions.

Once the film has been stretched, it is then processed through an oven to create and set desirable crystalline properties. By creating the proper crystalline properties, the end result is an oriented film with desirable commercial mechanical and chemical resistance properties that are useful in a variety of markets, particularly the food and beverage can market.

In an important embodiment of the invention, it was discovered that it was possible to laminate the BoPET film to a metal substrate at a post heat temperature lower than the BoPET film melting temperature. A tie layer could be included in the film, but also a mono layer BoPET film could equally be bonded under the right processing conditions.

FIG. 1 an example of a continuous metal lamination line. It is generally conceived that the process will be continuous (such as shown in FIG. 1) or a batch process (without the looping towers shown in FIG. 1). Looping (storage) towers can be used at each end of the line, or at one end of the line such as the entry end.

The major processing sections are cleaning, raising the surface energy (if needed after cleaning), preheating, laminating, post heating, and cooling. The type of film used in this invention is generally conceived as BoPET. The process section would include needed control for processing parameters, such as temperature, and line control that would marry the film and processing parameters for the commercial end result to achieve high bonding and chemical resistance.

The material handling sections comprise tension control units, steering units, film unwinding/rewinding, splicing equipment, idler rolls, and shearing equipment.

Line support equipment and processes are also utilized, which includes water cooling systems, air compressors, hydraulic systems, venting equipment, heating and cooling equipment, control systems, operator stations, electrical systems, water supply systems, electrical and gas supply systems, testing equipment, coil handling equipment, cranes, order entry equipment, tagging and inventory control, etc.

The production line sequence follows. The film is unwound from one of two payoff reels 101 and then fed through threading pinch rolls 102 to an entry strip shear. Here the strip is sheared 103 in readiness for splicing 104 by a welder, joiner, or other strip connecting means. The strip then goes through an entry looping tower 107. A pair of bridle rolls 105a,b provide tension control on either side of the entry looping tower 118, and a steering roll 106a provides strip tracking control. The strip proceeds through a cleaning section 109 which is an alkaline cleaner, rinse, and air blow-off. The strip is optionally pretreated for surface energy by 110 if needed to raise the surface energy of the metal strip. The strip is then preheated by a preheat station 111 to raise the temperature to a laminating temperature. The strip then enters the laminating station 112 where one or two films are bonded to the metal strip. The strip proceeds to a post heat oven 113 where the metal film laminate temperature is raised to a final bonding temperature. Exit air blow offs 114 after the post heat oven provide initial cooling. Twin contact cooling rolls 115 provide additional cooling of the metal film laminate in preparation of winding the finished product. An optional lubricator 116 is used if a customer desires lubrication on the metal-laminate surface. An exit looping tower 118 provides strip storage for the winding reels 121. A pair of bridle rolls 105c,d provide tension control on either side of the exit looping tower 118, and a steering roll 106b provides strip tracking control. An exit shear 120 cuts the metal strip just before the winding reels 121.

The metal-polymer laminate is heated in the post treating oven 113 to a bonding temperature. In the case of a BoPET film, a bonding temperature has been found to be lower than the melting point of the film by between 10 to 200° F., which preserves the film crystallinity. A preferred bonding temperature was found to be in the range of 300-490° F. for the films tested, and also provided better chemical resistance properties.

Generally, a higher amount of crystallinity in the coating on the final metal laminate product is needed in order to develop a higher pencil hardness and chemical resistance. It is the normal case to design the film crystallinity level according to a balance between brittleness, surface hardness, and chemical resistance. For example, a higher crystallinity without suitable elongation makes the polymer overly brittle, which causes stamping defects. The post heat temperature and, to a lesser extent the residence time, in the post heat oven are important to create needed crystallinity to an optimum value that is needed for a particular market.

In the case of using BoPET film designed to be used in the can-making market, a BoPET film was discovered that balances adhesion, elongation, chemical resistance, gloss, and pencil hardness by selecting operating parameters at the biaxially oriented film line and also at the metal substrate-film laminating line.

In a preferred embodiment, the bonding of the film to the metal substrate incorporates a chemical bond. For the right preheat and post heat temperatures a BoPET film will bond to a high and completely commercially acceptable level. But this is not the only embodiment possible.

In another embodiment, a tie layer is utilized to create an enhanced bond, such as PETG (polyethylene terephthalate glycol), or a mixture of PET and PETG.

In one particular embodiment, amorphous PETG is used as a tie layer that offers higher improved and coating toughness in certain situations. It was found through practical experience that certain commercial stamping operations performed decidedly better when a PETG tie layer was used.

For the purposes of this patent application,
i) a coating with an adhesion value of at least 43 ounces per inch width is interpreted as a classification of 4 or 5 by ASTM test method D3359 using a tape with an adhesion level of 43 ounces per inch.
ii) a coating that passes a pack test is based on visual observation of adhesion and corrosion in comparison to other products that are in commercial use. Minor cosmetic defects such as haze or blushing are not considered a failure.
iii) a coating with a pencil hardness of a minimum of 2B means 2B or harder as measured by ASTM test method D3363.

FIG. 2 is a generalized expression of a metal lamination line. Each step will now be described.

Step 20: Uncoil strip—i.e. a flat rolled metal strip which feeds a continuous operation or a batch operation. The word 'strip' is not meant to define a particular gauge range. It is meant to mean a commercial flat rolled metal substrate.

Step 21: Clean Strip—one or both metal surfaces are cleaned by a cleaning solution, followed by rinsing and drying sections. It is preferable to utilize a water based cleaning solution that is either an acid, alkaline, or soap solution. It is desirable that the cleaning solution does not deposit any residual chemicals from the cleaning solution, such as surfactants or emulsions. If the cleaner is well designed, the surface energy is raised by this processing step, and there are no spots on the surface.

After cleaning, the surface to be coated is preferably freed of debris, oils, water, dirt, and other liquids for best adhesion. The metal surface could be conversion coated, pretreated, or coated with an organic primer, but these kinds of treatments are not required for desirable adhesion. However, for some applications, these kinds of pretreatments enhance the ability of the metal to provide corrosion protection.

In line surface cleaning equipment comprises dip tanks, spray systems, and electrical grid cleaning systems.

Surface energy levels out of the exit of the cleaning unit were measured at values above 70 dynes/cm. Surface energy values at this level are sufficient to allow the metal strip and film to bond without additional energy surface pretreatment.

Step 22: The surface energy treating equipment is used to raise the metal strip surface energy. The preferred equipment is any of a treating flame, corona, or plasma. Other possible methods include ozone treatment, ultra-high frequency electrical discharge, UV, or laser bombardment. In one embodiment the surface energy is raised to a minimum dyne/cm level of 45 for bonding adhesion. The invention has found that this kind of pretreatment (along with preheating) avoids difficulties reported by others with air entrapment. No air entrapment of any kind was observed on a line laminating at speeds up to 100 fpm, even when examined closely under a microscope. In a preferred embodiment, the surface energy level is raised above 70 dynes/cm for bonding.

Step 23: The metal strip is preheated to a temperature of 250 to 420° F., depending upon the film used. Heating methods are: flame fired oven, infrared oven, direct flame, convection oven, induction furnace, electric resistance heating, electric heating coils, gas fired furnace, and radiant heating. This step can be done simultaneously with step 22 if a flame is used.

In one embodiment, the preheater utilizes premix burner that provides preheating of the metal to at least 200° F., and preferably to a range between 320-420° F. in the case of a BoPET film. It has been found that there has to be at least some bond established at the laminating nip that will be maintained at the entry of the post treating equipment. If the green strength (initial bond) is not properly created, the film will tend to lift off of the metal in the post treating operation and bond in a wrinkled or bunched manner.

A temperature sensor after the preheater, which measures the metal temperature, is preferably utilized for preheat temperature control.

In the case of BoPET, preheating the metal substrate above 320° F. provides suitable green strength from a process standpoint. However, preheating the metal substrate too high can cause film to stick to the laminating rolls rather than the metal substrate. It was found that temperatures of 320 to 420° F. worked satisfactorily, depending upon the type of BoPET film used.

In the case of BoPET, the polyester films tend to have melting points ranging from 480 to 510° F., depending upon the type of film, as well as additives and mixtures added into the polyester. One significant embodiment of the invention is to maintain the preheating of the metal strip below the melting point of the film layer in contact with the metal.

Step 24: Laminate at least one side of the metal strip by use of a roll pair. Either or both rolls are optionally heated, but this is not a requirement. Heating the nip roll avoids startup issues due to a cold roll. The width and position of the film must match the metal strip to a commercial tolerance. A second roll pair is optionally utilized, if desired, for laminating a second film in sequence to the first pair. If both sides of the strip are to be laminated, any needed surface pretreatment is performed on the second side to ensure the surface energy of the second side is elevated prior to laminating, as well as any needed heating to obtain the proper preheat temperature at the second roll pair.

The nip rollers press the one or both films onto the metal substrate by use of compressed air cylinders, hydraulic cylinders, screws, mechanical springs, or other mechanical means to create a force. The nip rolls are optionally heated, but not so high a temperature as to cause the films to melt or to have a preferential adherence to the laminating nip rolls rather than to the metal substrate. Generally, a threshold nip pressure is required to establish an initial bonding between the film and metal substrate without air entrapment.

Step 25a,b: Film—at least one is predominately BoPET, that is, at least 50% polyester by weight. Tie layers, colors, and various additives necessary for color dispersion may be added to the polyester. Also, admixed compounds that increase pencil hardness, provide surface lubrication, provide better processing, provide UV resistance, or create desired gloss are optionally added.

Step 26: The metal polymer-laminate is post heated, preferably by a heating source, to a temperature lower than the melting point of the BoPET film. Possible post heating ovens are (but not restricted to): induction, flame fired, infrared, direct flame impingement, nearly direct flame impingement, convection, electric resistance heating, electric heating coils, and radiant heating. An infrared sensor is preferably installed to monitor the exit temperature to ensure proper control. Other oven temperature sensors are optionally used to provide improved control.

For the post treating operation, it is important that the polymer is carefully trimmed to be inside the edges of the metal strip or within a close tolerance of the edges. The heating on the overhanging polymer is likely to cause melting or burning of the overhanging polymer. This can cause operational problems such as smoking, polymer dripping, and minor flames which may cause unsafe or unclean operational practices.

The post treating step ensures that the process provides a reliable commercial bonding between the polyester film and the metal substrate. The post treating step also establishes the final commercial adhering bond.

Step 27: After the post treating step, a surface finishing step is optionally applied to one or both surfaces of the polymer if needed for the markets the metal-polymer laminate is being sold to. A pinch roll is preferably used to apply a surface finish while the polymer is still in the softened state.

Step 28: After the post treating step, a cool down rate is performed that allows the polyester film to maintain desired crystallinity. The cooling is performed by forced air, a liquid spray system, one or more contact cooling rolls, or a combination.

A temperature sensor can be used to regulate the amount of air cooling utilized.

When laminating a BoPET film, the function of the exit cooling section is to lower the strip temperature, preferably in a rapid manner. One important benefit of rapid cooling is improved gloss and clarity in the final product.

Step 29: After the cool down step, the metal-polymer laminate is recoiled at a temperature that will not cause problems with lap to lap shrinkage or slippage. Generally, temperatures less than 150° F. are preferred to ensure there are no winding or storage problems.

Crystallinity in the BoPET film is measured by a Differential Scanning calorimeter (DSC) as is known in the art.

It is desirable to have the ability to continuously run multiple rolls of film in sequence without stopping if metal strip storage is added to the laminating line. In this case, the ability to switch over to films of different colors and widths is a distinct production advantage. This adds capital cost and operational complexity to the laminating line, but it also provides an overall lower operating cost and a better operation. It is not appealing to stop a line in the middle of a run for the sake of starting a new film roll, as a customer will find yield losses and off specification material objectionable in a finished coil.

FIGS. 3A-3B show various film-metal substrate layer configurations. A metal substrate 304, such as tinplate or tin free steel (TFS), is coated with a film utilizing three layers. The tie layer 303 (or bonding layer) is utilized to facilitate bonding between the film and the metal substrate. In one embodiment, the tie layer utilizes an amorphous polymer, such as a PETG, to improve the bonding. In this case, the tie layer is a PET that has been created separately from the bulk layer 302 and top layer 301. It is possible to create polyester film structures with different layers in the film by utilizing different extruders, resin grades, and mixtures of polyester. Preferably, the film comprises one, two, or three layers, but this is not a strict requirement. A higher number of layers could equally be used.

FIG. 4 shows a close up of a preferred embodiment of a laminating station. A metal substrate has already been pre-treated and had the surface energy elevated as explained in FIG. 1. Film from an upper film roll 401 with an attached rotary tension brake 404 unwinds film which passes through idler rolls and a tensiometer roll 405 to a trimming station where one or both sides of the film is trimmed by a razor slitter 406. The tension brake 404 is controlled by the tensiometer roll 405 tension measurement. The film is trimmed to match the metal substrate width to a desired tolerance. The film roll, slitting station, idler rolls, and tensiometer roll are mounted on a shifting frame 402 with guide rails 403. The shifting frame 402 is used to position the film via a film position sensor 407 in order to match the film position to the metal substrate steel position as measured by a metal position sensor 408 just prior to the nip rolls 409. A trim removal vacuum tube 410 removes film trim from the slitting station. A matching system is utilized for the lower film roll.

The overall goal is to present the film(s) at the nip roll without wrinkle, at the correct width, and at the correct position. This allows ordering film widths in lot sizes that are not the same width as the metal substrate, which can provide better polymer inventory control. The film cutting knives are preferably score cut, razor cut, or shear slitting.

The examples following were run without any visible air entrapment between the metal substrate and the film. Air entrapment was not visible even when viewed under magnification capable of seeing bubbles as small as 0.5 micron in diameter.

TABLE 1

Table 1 - Examples of Pack Tests at 30 Days:

| Product Variable | Can End Observation | Overall Condition |
| --- | --- | --- |
| Whipped Cream | No Corrosion/Delamination | Good |
| Cooking Pan Spray | No Corrosion/Delamination | " |
| Magic Sizing | No Corrosion/Delamination | " |
| Starch | No Corrosion/Delamination | " |
| Hair Mousse | No Corrosion/Delamination | " |
| Hairspray | No Corrosion/Delamination | " |
| Tub & Tile Cleaner | No Corrosion/Delamination | " |
| Brake Cleaner | No Corrosion/Delam (Film Slightly Cloudy) | " |
| Duster | No Corrosion/Delam (Film Slightly Cloudy) | " |
| Scrubbing Product | No Corrosion/Delam (Film Slightly Cloudy) | " |
| SeaFoam | No Corrosion/Delam (Film Slightly Cloudy) | " |
| Acetone | No Corrosion/Delam (Film Cloudy) | " |

Laminate Example 1: A film and tin free steel laminate where the film comprises a 15 micron biaxially oriented 2-layer PET structure. The steel substrate was a tin free steel (TFS) at a thickness of 0.0113". The outer most layer of the film was essentially PET. The inner layer of the film was 100% PETI approximately 3 micron in thickness, and was in direct contact with the electrolytic chromium coated steel (TFS). Adhesion of the film to the steel was acquired through the thermal lamination process as described within and required no additional adhesive layer. Specifically, the steel was uncoiled and passed through a wash process according to the teachings of this invention, by a mildly alkaline aqueous solution, then rinsed and dried using blowoffs. Following the cleaning process the steel was flame treated to remove any residual moisture, the surface energy was increased and the temperature raised to 315° F. The film was brought into contact with the steel by means of a pair of nipped rolls forming an initial lamination bond of the film to the steel. Subsequently the film/steel laminate was passed through an IR oven increasing the laminate to a temperature of 350° F. The film/steel laminate was passed over a pair of 90° F. cooling rolls to reduce the laminate to a rewinding temperature and control crystallinity of the film. The film/steel laminate exhibited good formability during drawing processes and the film maintained excellent adhesion to the steel throughout drawing and retort processes.

Laminate Example 2: A film and tin free steel laminate where the film comprises a 15 micron biaxially oriented 2-layer PET structure. The steel substrate was a tin free steel (TFS) at a thickness of 0.0113". The outer most layer of the film was essentially PET. The inner layer of the film was 99.9% PET and approximately 3 micron in thickness and was in direct contact with the electrolytic chromium coated steel (TFS). Adhesion of the film to the steel was acquired through the thermal lamination process as described within and required no additional adhesive layer. Specifically, the steel was uncoiled and passed through a cleaning process using a mildly basic aqueous solution, then rinsed and dried. Following the cleaning process the steel was flame treated to remove any residual moisture, the surface energy was increased and the temperature raised to 380° F. The film was brought into contact with the steel by means of a pair of nipped rolls forming an initial lamination bond of the film to the steel. Subsequently the film/steel laminate was passed through an IR oven increasing the laminate to a temperature of 410° F. The film/steel laminate was passed over a pair of 130° F. cooling rolls to reduce the laminate to a rewinding temperature and control crystallinity of the film. The film/steel laminate exhibited good formability during drawing processes and the film maintained excellent adhesion to the steel throughout drawing and retort processes. The resulting laminate had good resistance to high Ph chemicals.

Laminate Example 3: A film and tin free steel laminate where the film comprises a 15 micron biaxially oriented 2-layer PET structure. The steel substrate was a tin free steel (TFS) at a thickness of 0.0113". The outer most layer of the film was 99.9% PET and approximately 1 micron in thickness. The inner layer of the film was essentially PET, containing <1% PETI and was in direct contact with the electrolytic chromium coated steel (TFS). Adhesion of the film to the steel was acquired through the thermal lamination process as described within and required no additional adhesive layer. Specifically, the steel was uncoiled and passed through a cleaning process using a mildly basic aqueous solution, then rinsed and dried. Following the cleaning process the steel was flame treated to remove any residual moisture, the surface energy was increased and the temperature raised to 380° F. The film was brought into contact with the steel by means of a pair of nipped rolls forming an initial lamination bond of the film to the steel. Subsequently the film/steel laminate was passed through an IR oven increasing the laminate to a temperature of 400° F. The film/steel laminate was passed over a pair of 130° F. cooling rolls to reduce the laminate to a rewinding temperature and control crystallinity of the film. The film/steel laminate exhibited good formability during drawing processes and maintained excellent adhesion through retort processes.

Laminate Example 4: A film and tin free steel laminate where the film comprises a 15 micron biaxially oriented 2-layer PET structure. The steel substrate was a tin free steel (TFS) at a thickness of 0.0113". The outer most layer of the film was 99.9% PET and approximately 1 micron in thickness. The inner layer of the film was essentially PET, containing <1% PETI and was in direct contact with the electrolytic chromium coated steel (TFS). Adhesion of the film to the steel was acquired through the thermal lamination process as described within and required no additional adhesive layer. Specifically, the steel was uncoiled and passed through a cleaning process using a mildly basic aqueous solution, then rinsed and dried. Following the cleaning process the steel was flame treated to remove any residual moisture, the surface energy was increased and the temperature raised to 380° F. The film was brought into contact with the steel by means of a pair of nipped rolls forming an initial lamination bond of the film to the steel. Subsequently the film/steel laminate was passed through an IR oven increasing the laminate to a temperature of 450° F. The film/steel laminate was passed over a pair of 130° F. cooling rolls to reduce the laminate to a rewinding temperature and control crystallinity of the film. The film/steel laminate exhibited good formability during drawing and retort processes.

Laminate Example 5: A film and tin free steel laminate where the film comprises a 15 micron biaxially oriented 2-layer PET structure. The steel substrate was a tin free steel (TFS) at a thickness of 0.0113". The outer most layer of the film was approximately 99.9% PET and was approximately 1 micron in thickness. The inner layer of the film was essentially PET, and was in direct contact with the electrolytic chromium coated steel (TFS). Adhesion of the film to the steel was acquired through the thermal lamination process as described within and required no additional adhesive layer. Specifically, the steel was uncoiled and passed through a cleaning process using a mildly basic aqueous solution, then rinsed and dried. Following the cleaning process the steel was flame treated to remove any residual moisture, the surface energy was increased and the temperature raised to 410° F. The film was brought into contact with the steel by means of a pair of nipped rolls forming an initial lamination bond of the film to the steel. Subsequently the film/steel laminate was passed through an IR oven maintaining the laminate at a temperature of 400° F. for <10 seconds. The film/steel laminate was passed over a pair of 130° F. cooling rolls to reduce the laminate to a rewinding temperature and control crystallinity of the film. The film/steel laminate exhibited good formability during drawing and retort processes.

Laminate Example 6: A film and tin free steel laminate where the film comprises a 15 micron biaxially oriented 2-layer PET structure. The steel substrate was a tin free steel (TFS) at a thickness of 0.0113". The outer most layer of the film was approximately 99.9% PET and was approximately 1 micron in thickness. The inner layer of the film was essentially PET, and was in direct contact with the electrolytic chromium coated steel (TFS). Adhesion of the film to the steel was acquired through the thermal lamination process as described within and required no additional adhesive layer. Specifically, the steel was uncoiled and passed through a cleaning process using a mildly basic aqueous solution, then rinsed and dried. Following the cleaning process the steel was flame treated to remove any residual moisture, the surface energy was increased and the temperature raised to 410° F. The film was brought into contact with the steel by means of a pair of nipped rolls forming an initial lamination bond of the film to the steel. Subsequently the film/steel laminate was passed through an IR oven maintaining the laminate at a temperature of 500° F. for <10 seconds. The film/steel laminate was passed over a pair of 130° F. cooling rolls to reduce the laminate to a rewinding temperature and control crystallinity of the film. The film/steel laminate exhibited excellent resistance to high pH chemicals (up to 12.3) and good formability during drawing processes. The film maintained excellent adhesion to the steel throughout drawing and retort processes.

Laminate Example 7: A film and tin free steel laminate where the film comprises a 15 micron biaxially oriented 2-layer PET structure. The steel substrate was a tin free steel (TFS) at a thickness of 0.0113". The outer most layer of the film was approximately 94.9% PET and was approximately 1 micron in thickness. The inner layer of the film was essentially PET, and was in direct contact with the electrolytic chromium coated steel (TFS). Adhesion of the film to the steel was acquired through the thermal lamination process as described within and required no additional adhesive layer. Specifically, the steel was uncoiled and passed through a cleaning process using a mildly basic aqueous solution, then rinsed and dried. Following the cleaning process the steel was flame treated to remove any residual moisture, the surface energy was increased and the temperature raised to 410° F. The film was brought into contact with the steel by means of a pair of nipped rolls forming an initial lamination bond of the film to the steel. Subsequently the film/steel laminate was passed through an IR oven maintaining the laminate at a temperature of 400° F. for <10 seconds. The film/steel laminate was passed over a pair of 130° F. cooling rolls to reduce the laminate to a rewinding temperature and control crystallinity of the film. The film/steel laminate exhibited good formability during drawing and retort processes.

Laminate Example 8: A film and tin free steel laminate where the film comprises a 15 micron biaxially oriented 2-layer PET structure. The steel substrate was a tin free steel (TFS) at a thickness of 0.0113". The outer most layer of the film was approximately 94.9% PET and approximately 1 micron in thickness. The inner layer of the film was essentially PET, and was in direct contact with the electrolytic chromium coated steel (TFS). Adhesion of the film to the steel was acquired through the thermal lamination process as described within and required no additional adhesive layer. Specifically, the steel was uncoiled and passed through a cleaning process using a mildly basic aqueous solution, then rinsed and dried. Following the cleaning process the steel was flame treated to remove any residual moisture, the surface energy was increased and the temperature raised to 410° F. The film was brought into contact with the steel by means of a pair of nipped rolls forming an initial lamination bond of the film to the steel. Subsequently the film/steel laminate was passed through an IR oven maintaining the laminate at a temperature of 500° F. for <10 seconds. The film/steel laminate was passed over a pair of 130° F. cooling rolls to reduce the laminate to a rewinding temperature and control crystallinity of the film. The film/steel laminate exhibited good resistance to high pH chemicals (up to 12.3) and good formability during drawing processes. However, the laminate had poor resistance to blushing during retort processing. The film maintained excellent adhesion to the steel throughout drawing and retort processes.

Laminate Example 9: A film and tin free steel laminate where the film comprises a 15 micron biaxially oriented 2-layer PET structure. The steel substrate was a tin free steel (TFS) at a thickness of 0.0113". The outer most layer of the film was approximately 89.9% PET, 10% PBT, and was approximately 1 micron in thickness. The inner layer of the film was essentially PET, and was in direct contact with the electrolytic chromium coated steel (TFS). Adhesion of the film to the steel was acquired through the thermal lamination process as described within and required no additional adhesive layer. Specifically, the steel was uncoiled and passed through a cleaning process using a mildly basic aqueous solution, then rinsed and dried. Following the cleaning process the steel was flame treated to remove any residual moisture, the surface energy was increased and the temperature raised to 410° F. The film was brought into contact with the steel by means of a pair of nipped rolls forming an initial lamination bond of the film to the steel. Subsequently the film/steel laminate was passed through an IR oven maintaining the laminate at a temperature of 400° F. for <10 seconds. The film/steel laminate was passed over a pair of 130° F. cooling rolls to reduce the laminate to a rewinding temperature and control crystallinity of the film. The film/steel laminate exhibited good formability during drawing and retort processes.

Laminate Example 10: A film and tin free steel laminate where the film comprises a 15 micron biaxially oriented 2-layer PET structure. The steel substrate was a tin free steel (TFS) at a thickness of 0.0113". The outer most layer of the film was approximately 89.9% PET, 10% PBT, and was approximately 1 micron in thickness. The inner layer of the film was essentially PET, and was in direct contact with the electrolytic chromium coated steel (TFS). Adhesion of the film to the steel was acquired through the thermal lamination process as described within and required no additional adhesive layer. Specifically, the steel was uncoiled and passed through a cleaning process using a mildly basic aqueous solution, then rinsed and dried. Following the cleaning process the steel was flame treated to remove any residual moisture, the surface energy was increased and the temperature raised to 410° F. The film was brought into contact with the steel by means of a pair of nipped rolls forming an initial lamination bond of the film to the steel. Subsequently the film/steel laminate was passed through an IR oven maintaining the laminate at a temperature of 500° F. for <10 seconds. The film/steel laminate was passed over a pair of 130° F. cooling rolls to reduce the laminate to a rewinding temperature and control crystallinity of the film. The film/steel laminate exhibited good resistance to high pH chemicals (up to 12.3) and good formability during drawing and retort processes.

Laminate Example 11: A film and tin free steel laminate where the film comprises a 12 micron biaxially oriented 3-layer PET structure. The steel substrate was a tin free steel (TFS) at a thickness of 0.0113". The outer most layer of the film was essentially PET approximately 1 micron in thickness. The middle layer of the film was PET blended with 8-10% TiO2 as a whitening agent. The inner layer of the film contains a blend of PETG and PET, was approximately 1 micron in thickness, and was in direct contact with the electrolytic chromium coated steel (TFS). Adhesion of the film to the steel was acquired through the thermal lamination process as described within and required no additional adhesive layer. Specifically, the steel was uncoiled and passed through a cleaning process using a mildly basic aqueous solution, then rinsed and dried. Following the cleaning process the steel was flame treated to remove any residual moisture, the surface energy was increased and the temperature raised to 375° F. The film was brought into contact with the steel by means of a pair of nipped rolls forming an initial lamination bond of the film to the steel. Subsequently the film/steel laminate was passed through an IR oven increasing the laminate to a temperature of 400° F. The film/steel laminate was passed over a pair of 130° F. cooling rolls to reduce the laminate to a rewinding temperature and control crystallinity of the film. The film/steel laminate exhibited good formability during drawing retort processes. The middle layer of the film being only 10 micron in thickness cannot carry enough TiO2 to yield a laminate with the desired L* of >80.

Laminate Example 12: A film and tin free steel laminate where the film comprises a 23 micron biaxially oriented 3-layer PET structure. The steel substrate was a tin free steel (TFS) at a thickness of 0.0113". The outer most layer of the film was essentially PET approximately 1 micron in thickness. The middle layer of the film was PET containing TiO2 as a whitening agent. The inner layer of the film contains a blend of PETG and PET, was approximately 1 micron in thickness, and was in direct contact with the electrolytic chromium coated steel (TFS). Adhesion of the film to the steel was acquired through the thermal lamination process as described within and required no additional adhesive layer. Specifically, the steel was uncoiled and passed through a cleaning process using a mildly basic aqueous solution, then rinsed and dried. Following the cleaning process the steel was flame treated to remove any residual moisture, the surface energy was increased and the temperature raised to 375° F. The film was brought into contact with the steel by means of a pair of nipped rolls forming an initial lamination bond of the film to the steel. Subsequently the film/steel laminate was passed through an IR oven increasing the laminate to a temperature of 400° F. The film/steel laminate was passed over a pair of 130° F. cooling rolls to reduce the laminate to a rewinding temperature and control crystallinity of the film. The film/steel laminate exhibited good formability during drawing processes and retort processes.

Laminate Example 13: A film and tin free steel laminate where the film comprises a 23 micron biaxially oriented 3-layer PET structure. The steel substrate was a tin free steel (TFS) at a thickness of 0.0113". The outer most layer of the film was essentially PET approximately 1 micron in thickness. The middle layer of the film was PET containing TiO2 as a whitening agent. The inner layer of the film contains a blend of PETG and PET, was approximately 1 micron in thickness, and was in direct contact with the electrolytic chromium coated steel (TFS). Adhesion of the film to the steel was acquired through the thermal lamination process as described within and required no additional adhesive layer. Specifically, the steel was uncoiled and passed through a cleaning process using a mildly basic aqueous solution, then rinsed and dried. Following the cleaning process the steel was flame treated to remove any residual moisture, the surface energy was increased and the temperature raised to 375° F. The film was brought into contact with the steel by means of a pair of nipped rolls forming an initial lamination bond of the film to the steel. Subsequently the film/steel laminate was passed through an IR oven increasing the laminate to a temperature of 500° F. The film/steel laminate was passed over a pair of 130° F. cooling rolls to reduce the laminate to a rewinding temperature and control crystallinity of the film. The film/steel laminate exhibited good formability and adhesion during drawing and retort processes.

Laminate Example 14: A film and tin free steel laminate where the film comprises a 23 micron biaxially oriented 3-layer PET structure. The steel substrate was a tin free steel (TFS) at a thickness of 0.0113". The outer most layer of the film was essentially PET approximately 1 micron in thickness. The middle layer of the film was PET containing TiO2 as a whitening agent. The inner layer of the film contains a blend of PETG and PET, was approximately 1 micron in thickness, and was in direct contact with the electrolytic chromium coated steel (TFS). Adhesion of the film to the steel was acquired through the thermal lamination process as described within and required no additional adhesive layer. Specifically, the steel was uncoiled and passed through a cleaning process using a mildly basic aqueous solution, then rinsed and dried. Following the cleaning process the steel was flame treated to remove any residual moisture, the surface energy was increased and the temperature raised to 375° F. The film was brought into contact with the steel by means of a pair of nipped rolls forming an initial lamination bond of the film to the steel. Subsequently the film/steel laminate was passed through an IR oven increasing the laminate to a temperature of 400° F. The film/steel laminate was passed over a pair of 130° F. cooling rolls to reduce the laminate to a rewinding temperature and control crystallinity of the film. The film/steel laminate exhibited good formability and adhesion during drawing and retort processes.

Laminate Example 15: A film and tin free steel laminate where the film comprises a 15 micron biaxially oriented 2-layer PET structure. The steel substrate was a tin free steel (TFS) at a thickness of 0.0113". The outer most layer of the film was essentially PET. The inner layer of the film was 100% PETI approximately 3 micron in thickness, and was in direct contact with the electro tin plated steel (ETP). Adhesion of the film to the steel was acquired through the thermal lamination process as described within and required no additional adhesive layer. Specifically, the steel was uncoiled and passed through a cleaning process using a mildly basic aqueous solution, then rinsed and dried. Following the cleaning process the steel was flame treated to remove any residual moisture, the surface energy was increased and the temperature raised to 315° F. The film was brought into contact with the steel by means of nipped rolls forming an initial lamination bond of the film to the steel. Subsequently the film/steel laminate was passed through an IR oven increasing the laminate to a temperature of 350° F. The film/steel laminate was passed over a pair of 90° F. cooling rolls to reduce the laminate to a rewinding temperature and control crystallinity of the film. The film/steel laminate exhibited good formability and adhesion during drawing retort processes however, the adhesion was less robust than other examples where the same film was thermally bonded to TFS.

Laminate Example 16: A film and tin free steel laminate where the film comprises a 15 micron biaxially oriented 2-layer PET structure. The steel substrate was a tin free steel (TFS) at a thickness of 0.0113". The outer most layer of the film was essentially PET. The inner layer of the film was a blend of PET and PETG, was approximately 1 micron in thickness, and was in direct contact with the aluminum (Al). Adhesion of the film to the aluminum was acquired through the thermal lamination process as described within and required no additional adhesive layer. Specifically, the aluminum coil was unwound and passed through a cleaning process using a mildly basic aqueous solution, then rinsed and dried. Following the cleaning process the aluminum was flame treated to remove any residual moisture, increase the surface energy, and raise the temperature of the aluminum to a laminating temperature of 375° F. The film was brought into contact with the aluminum by means of a pair of nipped rolls forming an initial lamination bond of the film to the aluminum. Subsequently the film/aluminum laminate was passed through an IR oven increasing the laminate to a temperature of 400° F. The film/aluminum laminate was passed over a pair of 120° F. cooling rolls to reduce the laminate to a rewinding temperature and control crystallinity of the film. The film/aluminum laminate exhibits good formability during drawing processes and the film maintained good adhesion to the aluminum throughout drawing and retort processes however, the adhesion was less robust than other examples where the same film was thermally bonded to TFS.

Summary of film testing is in tables 2 and 3 following:

TABLE 2

| Example Laminate | Metal Substrate | Film type bonded to metal | Approx bonding layer Tg (F.) | Film bonding layer $T_m$ (F.) | Adhesive layer | Pre-heat (F.) | Post Lam Temp (F.) |
|---|---|---|---|---|---|---|---|
| 1 | TFS | PETI (A) | <180 | <480 | None | 315 | 350 |
| 2 | TFS | PET (B) | 180 | 500 | None | 380 | 410 |
| 3 | TFS | PET/PETI (A) | 180 | 490 | None | 380 | 400 |
| 4 | TFS | PET/PETI (A) | 180 | 490 | None | 380 | 450 |
| 5 | TFS | PET (A) | 180 | 500 | None | 410 | 400 |
| 6 | TFS | PET (A) | 180 | 500 | None | 410 | 500 |
| 7 | TFS | PET (A) | 180 | 500 | None | 410 | 400 |
| 8 | TFS | PET (A) | 180 | 500 | None | 410 | 500 |
| 9 | TFS | PET (A) | 180 | 500 | None | 410 | 400 |
| 10 | TFS | PET (A) | 180 | 500 | None | 410 | 500 |
| 11 | TFS | PET/PETG (A) | 180 | 480 | None | 375 | 400 |
| 12 | TFS | PET/PETG (A) | 180 | 480 | None | 375 | 400 |
| 13 | TFS | PET/PETG (A) | 180 | 480 | None | 375 | 500 |
| 14 | TFS | PET/PETG (A) | 180 | 480 | None | 375 | 400 |
| 15 | ETP | PETI (A) | <180 | <480 | None | 315 | 350 |
| 16 | Al | PET/PETG (A) | 180 | 480 | None | 375 | 400 |

TABLE 3

| Example Laminate | Ease of Lamination | Formability | Adhesion | Impact resistance | Food resistance | Chemical resistance |
|---|---|---|---|---|---|---|
| 1 | Excellent | Good | Good | Good | Fair | Poor |
| 2 | Good | Good | Excellent | Good | Good | Good |
| 3 | Good | Good | Excellent | Good | Excellent | Good |
| 4 | Good | Good | Excellent | Good | Excellent | Good |
| 5 | Good | Good | Excellent | Good | Excellent | Poor |
| 6 | Good | Good | Excellent | Good | Excellent | Excellent |
| 7 | Good | Good | Excellent | Good | Excellent | Poor |
| 8 | Good | Good | Excellent | Good | Excellent | Good |
| 9 | Good | Good | Excellent | Good | Excellent | Poor |
| 10 | Good | Good | Excellent | Good | Excellent | Good |
| 11 | Excellent | Good | Excellent | Good | Good | Fair |
| 12 | Excellent | Good | Excellent | Good | Good | Fair |

TABLE 3-continued

| Example Laminate | Ease of Lamination | Formability | Adhesion | Impact resistance | Food resistance | Chemical resistance |
|---|---|---|---|---|---|---|
| 13 | Excellent | Good | Excellent | Good | Good | Fair |
| 14 | Excellent | Good | Excellent | Good | Good | Fair |
| 15 | Good | Good | Fair | Fair | Fair | Poor |
| 16 | Good | Good | Fair | Fair | Fair | Poor |

While various embodiments of the invention have been described, the invention may be modified and adapted to various operational methods to those skilled in the art. Therefore, this invention is not limited to the description and figure shown herein, and includes all such embodiments, changes, and modifications that are encompassed by the scope of the claims.

We claim:

1. A method of laminating a biaxially oriented polyester film onto a metal substrate to create desirable simultaneous commercial properties comprising:
    a. creating a biaxially oriented polyester film on a film manufacturing line,
    b. wherein said biaxially oriented polyester film has desirable commercial properties,
    c. increasing the surface energy of at least one major side of said metal substrate to a bonding level on a metal lamination line,
    d. preheating said metal substrate to at least 200° F.,
    e. pressing said biaxially oriented polyester film onto said at least one major side by use of a roll,
    f. thereby creating a metal polymer laminate,
    g. wherein said biaxially oriented polyester film is primarily thermoplastic polyester by weight,
    h. wherein said biaxially oriented polyester film comprises at least one layer,
    i. wherein said biaxially oriented polyester film comprises at least one of PET, PBT, PETG, and PETI,
    j. post treating said metal polymer laminate by heating said metal polymer laminate to at least a bonding temperature of said biaxially oriented polyester film to said metal substrate, wherein said bonding temperature is below a melting temperature of a layer of said biaxially oriented polyester film that is contacting said metal substrate,
    k. wherein said post treating of said metal polymer laminate preserves crystallinity in said biaxially oriented film according to a predetermined criterion, and
    l. cooling said metal polymer laminate,
    whereby said metal polymer laminate has said desirable simultaneous commercial properties after said cooling comprising:
    m. bonding of said biaxially oriented polyester film onto said metal substrate of at least 43 ounces per inch,
    n. a pencil hardness of at least 2B, and
    o. successfully passing metal can pack testing for at least thirty days.

2. The processing steps according to claim 1 wherein any said bond between said biaxially oriented polyester film and said metal substrate is created by use of an amorphous polyester.

3. The processing steps according to claim 2 wherein said bond between said biaxially oriented polyester film and said metal substrate is created by use of a PETI or PETG in a film layer in contact with said metal substrate.

4. The processing steps according to claim 1 wherein any said biaxially oriented polyester film is trimmed to substantially match the width of said metal substrate prior to being pressed against said metal substrate.

5. The processing steps according to claim 1 wherein said metal lamination line is either a continuous operation or a batch operation.

* * * * *